US011299047B1

(12) United States Patent
Szczerba et al.

(10) Patent No.: US 11,299,047 B1
(45) Date of Patent: Apr. 12, 2022

(54) ADAPTIVE TRANSFORMING MULTIFUNCTION DISPLAY CONTROL

(71) Applicant: GM GLOBAL TECHNOLOGY OPERATIONS LLC, Detroit, MI (US)

(72) Inventors: Joseph F. Szczerba, Grand Blanc, MI (US); Ki Hyun Ahn, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/141,391

(22) Filed: Jan. 5, 2021

(51) Int. Cl.
*B60K 37/06* (2006.01)

(52) U.S. Cl.
CPC ........ *B60K 37/06* (2013.01); *B60K 2370/126* (2019.05); *B60K 2370/164* (2019.05)

(58) Field of Classification Search
CPC .............. B60K 37/06; B60K 2370/126; B60K 2370/164
See application file for complete search history.

(56) References Cited

U.S. PATENT DOCUMENTS

| | | | | |
|---|---|---|---|---|
| 5,128,503 A * | 7/1992 | Frantz | ...................... | G05G 7/02 200/336 |
| 5,313,230 A * | 5/1994 | Venolia | ................. | G06F 3/0312 200/11 TW |
| 5,963,197 A * | 10/1999 | Bacon | .................... | G06F 3/0312 345/163 |
| 6,256,011 B1 * | 7/2001 | Culver | .................... | G06F 3/016 345/156 |
| 6,462,730 B2 * | 10/2002 | Numata | ............... | H01H 25/002 345/156 |
| 6,608,616 B2 * | 8/2003 | Lin | ........................ | G06F 3/0202 345/163 |
| 2002/0105495 A1 * | 8/2002 | Numata | ............... | H01H 25/002 345/156 |
| 2002/0154090 A1 * | 10/2002 | Lin | ........................ | G06F 3/0213 345/156 |
| 2003/0076303 A1 * | 4/2003 | Huppi | .................... | G06F 3/0362 345/163 |
| 2003/0107603 A1 * | 6/2003 | Clapper | .............. | G06F 3/03543 715/784 |
| 2005/0179661 A1 * | 8/2005 | Bohn | .................... | G06F 3/0312 345/163 |
| 2005/0231463 A1 * | 10/2005 | Yang | ..................... | G06F 3/0312 345/156 |
| 2006/0123362 A1 * | 6/2006 | Keely | ..................... | G06F 1/169 715/857 |
| 2008/0186279 A1 * | 8/2008 | Van Dalen | ............ | G06F 3/0338 345/163 |
| 2010/0073291 A1 * | 3/2010 | Hisatsugu | ............. | G06F 3/0338 345/161 |
| 2015/0138093 A1 * | 5/2015 | Young | ................... | G06F 3/0312 345/166 |
| 2015/0203124 A1 * | 7/2015 | Fairgrieve | .............. | B60K 35/00 701/23 |

(Continued)

*Primary Examiner* — Christopher E Leiby

(57) ABSTRACT

A vehicle system comprising: i) an infotainment system; ii) a dashboard display module; and iii) an adaptive transforming multifunction control module configured to receive manual inputs from a first occupant of the vehicle system. The adaptive transforming multifunction control module is configured to perform at least one operation based on a first selected function associated with the infotainment system.

13 Claims, 10 Drawing Sheets

(56) References Cited

U.S. PATENT DOCUMENTS

| | | | | |
|---|---|---|---|---|
| 2015/0286296 | A1* | 10/2015 | Wang | G06F 3/0317 |
| | | | | 345/163 |
| 2016/0371114 | A1* | 12/2016 | Schroepf | G06F 9/4843 |
| 2019/0383386 | A1* | 12/2019 | Harris | F16H 59/08 |
| 2020/0125228 | A1* | 4/2020 | Chion | B60K 37/06 |
| 2021/0057175 | A1* | 2/2021 | Kim | B60K 35/00 |

* cited by examiner

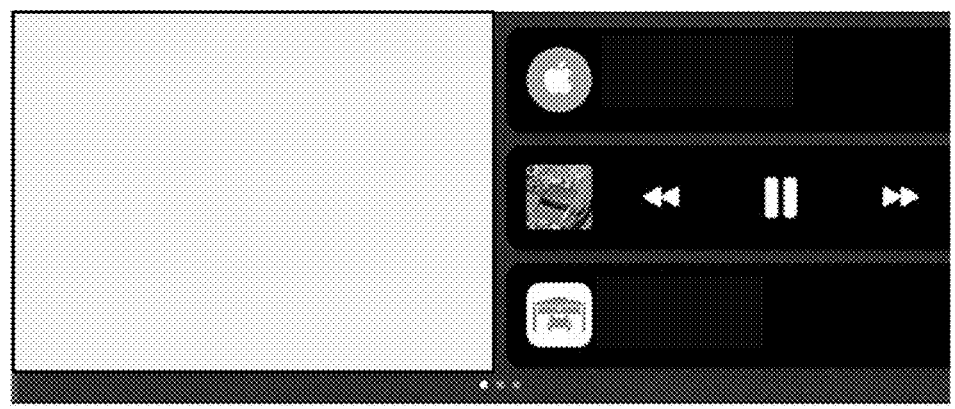
196
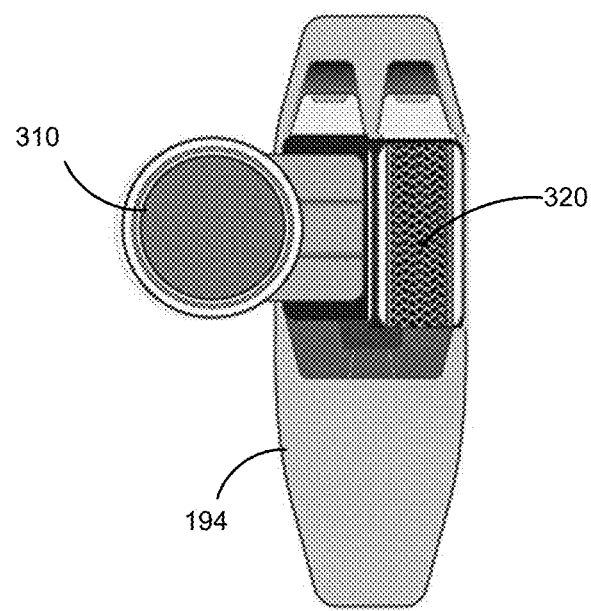
310
320
194
FIG. 7

ADAPTIVE TRANSFORMING MULTIFUNCTION DISPLAY CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Conventional vehicle displays are increasing in size and provide more screen area for driver and passenger use. These larger displays also provide display data for an increasing number of infotainment systems or functions (i.e., vehicle performance information and entertainment applications). However, vehicles still typically provide only one manual display control that allows one user to interact with these infotainment systems. Additionally, the manual display control is limited to one configuration that limits its usefulness in interacting with different types of infotainment systems.

There is a need for an improved display control that can interact with an increased number of infotainment systems and users.

SUMMARY

It is an object of the present disclosure to provide a vehicle system comprising: i) an infotainment system; ii) a dashboard display module; and iii) an adaptive transforming multifunction control module configured to receive manual inputs from a first occupant of the vehicle system. The adaptive transforming multifunction control module is configured to perform at least one operation based on a first selected function associated with the infotainment system.

In one embodiment, the adaptive transforming multifunction control module comprises a first control wheel, wherein the first control wheel is movable between a vertical orientation and a horizontal orientation in response to a manual input from the first occupant.

In another embodiment, the first control wheel is configured to operate as a scroll wheel in the vertical orientation based on the first selected function of the infotainment system displaying a scrollable list on the dashboard display module.

In still another embodiment, the adaptive transforming multifunction control module further comprises a first actuator arm that moves the first control wheel between the vertical orientation and the horizontal orientation.

In yet another embodiment, the first actuator arm comprises at least one control button configured to control the first selected function of the infotainment system.

In a further embodiment, the adaptive transforming multifunction control module comprises a second control wheel and wherein at least one operation associated with the second control wheel is configured based on one of: i) the first selected function; or ii) a second selected function associated with the infotainment system.

In a still further embodiment, the second control wheel is movable between a vertical orientation and a horizontal orientation in response to a manual input from the first occupant or a second occupant.

In a yet further embodiment, the second control wheel is configured to operate as a scroll wheel in the vertical orientation based on the first selected function or the second selected function displaying a scrollable list on the dashboard display module.

In one embodiment, the adaptive transforming multifunction control module further comprises a second actuator arm that moves the second control wheel between the vertical orientation and the horizontal orientation.

In another embodiment, the second actuator arm comprises at least one control button configured to control the first or second selected function of the infotainment system.

In still another embodiment, the adaptive transforming multifunction control module is disposed in a center console located between a driver seat and a front passenger seat of the vehicle system.

In yet another embodiment, the adaptive transforming multifunction control module is mounted in a faceplate associated with the center console.

In a further embodiment, the first and second control wheels are recessed in the faceplate in the vertical orientation.

In a still further embodiment, the first and second control wheels are raised out of the faceplate and rotated horizontally by the first and second actuator arms respectively when the first and second control wheels are moved between the vertical orientation and the horizontal orientation.

In a yet further embodiment, the first and second control wheels may be configured independently.

It is another object of the present disclosure to provide a method of receiving manual inputs from a first occupant of a vehicle system that includes an infotainment system, a dashboard display module, and an adaptive transforming multifunction control module. The method comprises: i) determining a first selected function of the infotainment system selected by the first occupant; and ii) configuring at least one operation of a first control wheel associated with the adaptive transforming multifunction control module based on the first selected function.

In one embodiment, the method further comprises moving the first control wheel between a vertical orientation and a horizontal orientation in response to a manual input from the first occupant.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 illustrates the exemplary adaptive transforming multifunction control module configured to interact with a second selected system interface.

In the drawings, reference numbers may be reused to identify similar and/or identical elements.

DETAILED DESCRIPTION

The present disclosure describes a reconfigurable multifunction "infotainment" controller that transforms the controller functionality from a single controller for one user to a dual controller for multiple users. In a vehicle that includes a "smart system" vehicle control module, the vehicle control module automatically transforms when multiple users enter the vehicle. For a single user, the reconfigurable multifunction control may provide additional controls when required or requested.

Advantageously, the user (driver or passenger) may manually choose the control configuration or orientation style based on user preference. The disclosed multifunction infotainment control module may adapt or transform as required to expose and enable other user controls in different configurations. The controls may be additional controls for a single user or duplicate controls for multiple users. The configuration and orientation of the controls may transform under user control or smart system control based on the selected infotainment system or function or based on user preference.

Figure 1:
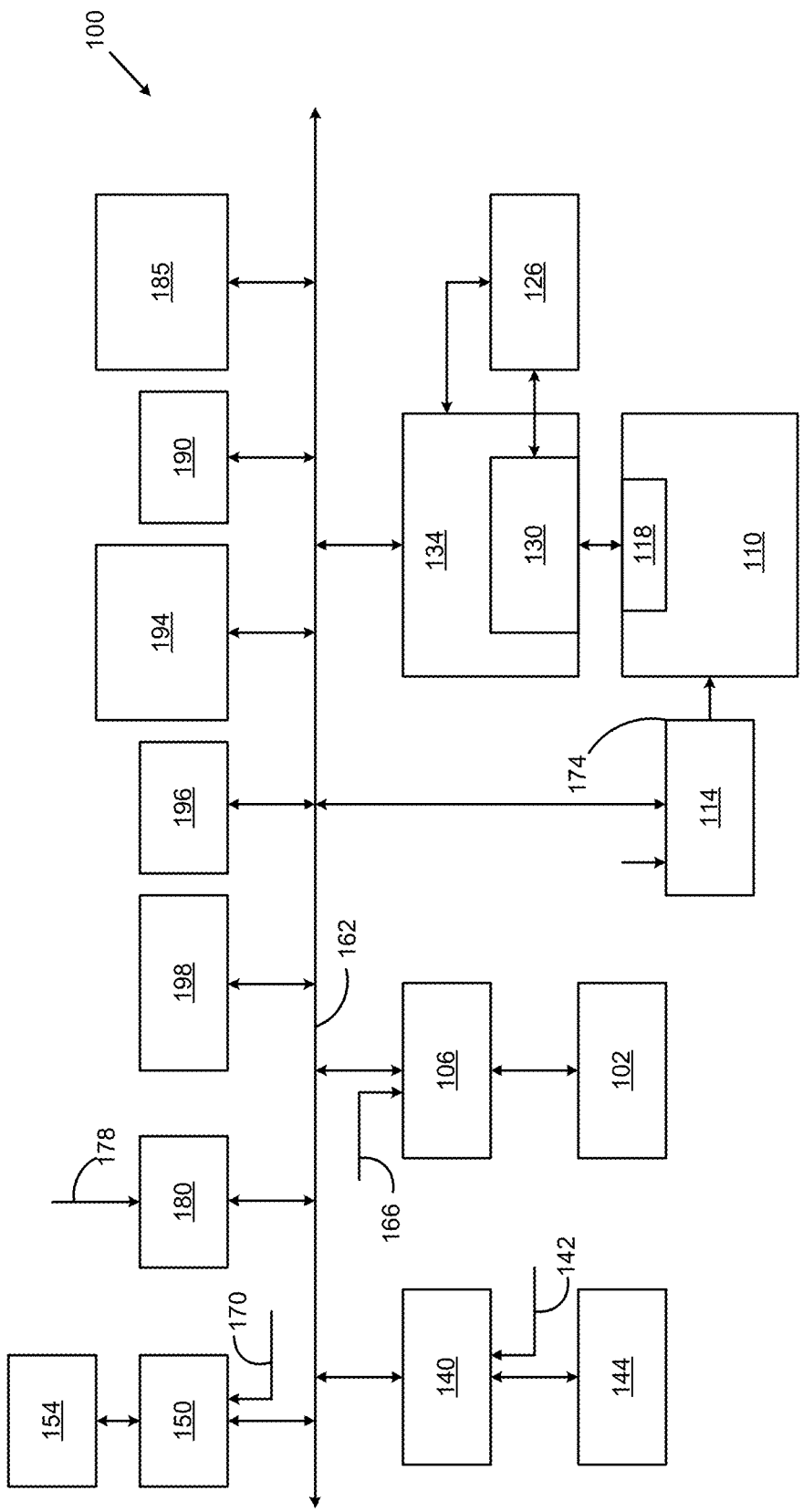
FIG. 1 is a functional block diagram of an exemplary vehicle system that includes an adaptive transforming multifunction control module according to an embodiment of the present disclosure.

FIG. 1 is a functional block diagram of an exemplary vehicle system 100 that includes an adaptive transforming multifunction control module 194 according to an embodiment of the present disclosure. While a vehicle system for a manually driven hybrid vehicle is shown and described, the present disclosure is also applicable to autonomously driven vehicles and to all-electric vehicles. The present disclosure may also be applicable to non-automobile implementations, such as trains, boats and aircraft.

An engine 102 combusts an air/fuel mixture to generate drive torque. An engine control module (ECM) 106 controls the engine 102 based on one or more driver or vehicle inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system 100 may include one or more electric motors. For example, an electric motor 118 may be implemented within the transmission 110 as shown in the example of FIG. 1. An electric motor can act either as a generator or as a motor at a given time. When acting as a generator, an electric motor converts mechanical energy into electrical energy. The electrical energy may charge a battery 126 via a power control device (PCD) 130. When acting as a motor, an electric motor generates torque that supplements or replaces torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel 194 within the vehicle and/or steering commands from one or more vehicle control modules. A steering wheel angle sensor (SWA) monitors rotational position of the steering wheel 194 and generates a SWA 142 signal based on the position of the steering wheel. As an example, the steering control module 140 may control vehicle steering via an EPS motor 144 based on the SWA 142 signal. However, the vehicle may include another type of steering system. An electronic brake control module (EBCM) 150 may selectively control brakes 154 of the vehicle.

Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 that may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

According to an exemplary embodiment of the present disclosure, the vehicle system 100 further comprises an advanced computing module 185, a sensors module 190, an adaptive transforming multifunction (TMF) control module 194, a dashboard display module 196, and an infotainment module 198. The sensors module 190 may include a plurality of sensors distributed through the vehicle system 100 that gather important information. The sensor information may include on-board sensor inputs, such as a steering wheel capacitive sensor, a steering wheel force sensor, a temperature sensor, a facial recognition sensor, a heart rate sensor, and a key fob. The sensors module 190 may also include a vehicle speed sensor, a steering wheel angle sensor data, brake status data, LiDAR system data, radar data, camera images, accelerometer data, engine temperature and RPM, and the like to determine the speed, direction, and location of the vehicle system 100. The sensor information also may include off-board sensor inputs, such as GPS data, traffic report data, satellite data, vehicle-to-vehicle data, a roadmap database, weather reports, and cellular data.

The advanced computing module 185 comprises a high performance computing platform that controls many of the higher order functions and lower order functions of the vehicle system 100. In a typical implementation, the advanced computing module 185 may comprise a microprocessor and an associated memory. The advanced computing module 185 executes a kernel program that controls the overall operation of the advanced computing module 185. According to the principles of the present disclosure, the advanced computing module 185 controls and adjusts the adaptive transforming multifunction control module 194 either autonomously or in response to a user input (e.g., pressing a button, spinning a control wheel, etc.).

Much of the information generated by the sensors module 190 may be processed by the advanced computing module 185 and displayed on the screen(s) of the dashboard display module 196. The advanced computing module 185 controls the infotainment module 198, which represents one or more systems in the vehicle system 100 that provide information or data to be displayed on the dashboard display module 196. For example, the infotainment module 198 may collectively represent the GPS navigation system, an AM/FM radio module, a satellite radio system, a CD player, a Bluetooth interface that wirelessly couples to a mobile phone to stream music files from the mobile phone and/or to make or to receive phone calls, the control interface for an HVAC system, the control interface for a cruise control system, and the like.

According to an advantageous embodiment, the advanced computing module 185 may comprise a "smart system" that executes one or more machine learning algorithms. The advanced computing module 185 receives a plurality of inputs including, but not limited to, manual control input data from the adaptive transforming multifunction control module 194 and sensor data, (e.g., camera input, key fob ID, mobile phone data, GPS data, Bluetooth inputs, media selection control data). The advanced computing module 185 generates system outputs, including, but not limited to, control module 194 commands that automatically reconfigures the adaptive transforming multifunction control module 194.

Figure 2:
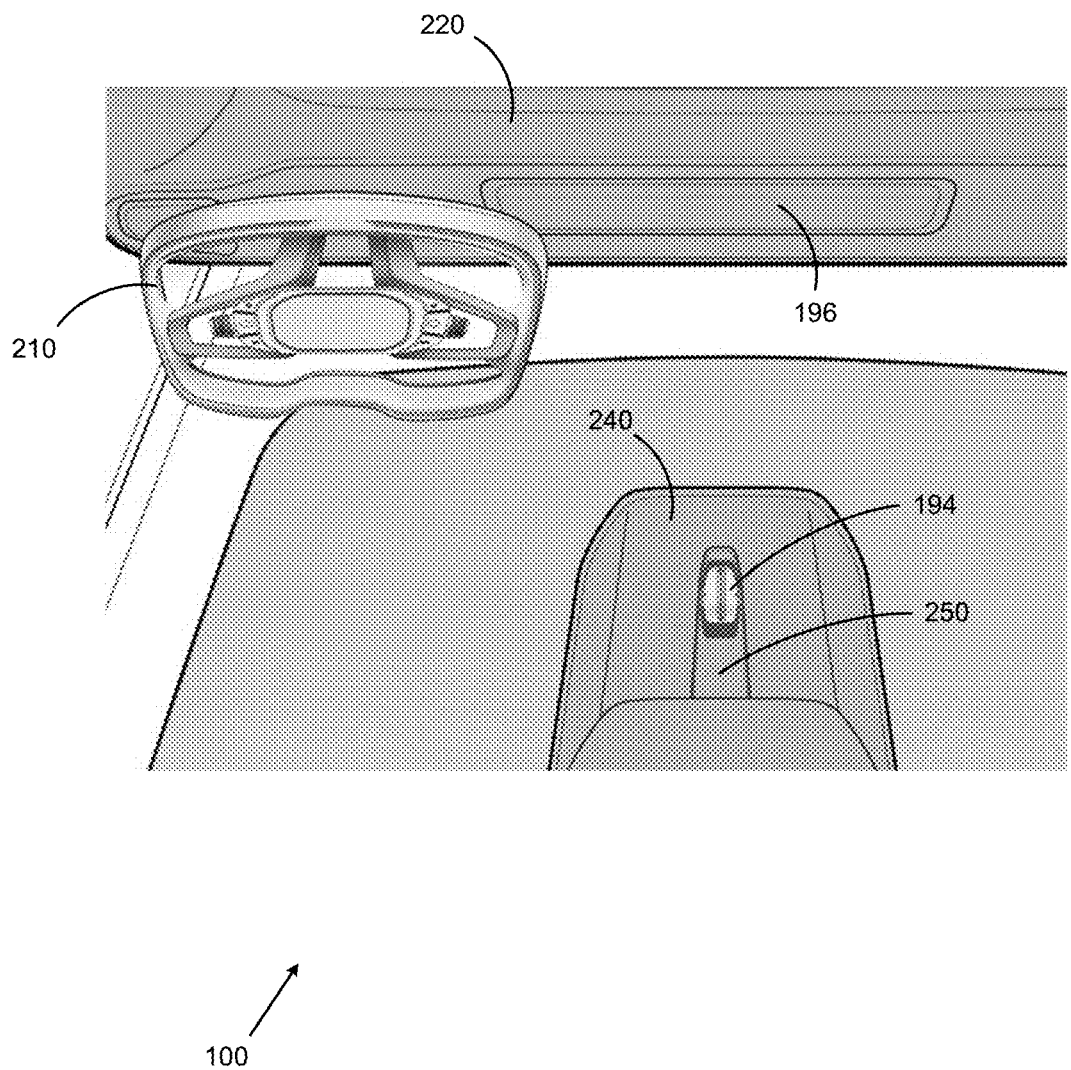
FIG. 2 is view of the interior of the vehicle system in FIG. 1.

FIG. 2 is view of the interior of the vehicle system 100 in FIG. 1. The vehicle system 100 includes a steering wheel 210, a dashboard 220, the display module 196, and a center console 240 located between the driver seat (not shown) and front passenger seat (not shown). Preferably, the adaptive transforming multifunction control module 194 is located on the center console 240 to provide access to both the driver and a second user in the front passenger seat. The center console 240 may include an opening covered by a faceplate 250. The adaptive transforming multifunction control module 194 is mounted within the faceplate 250 and is coupled to a plurality of electromechanical actuators disposed within the center console 240.

Figure 3A:
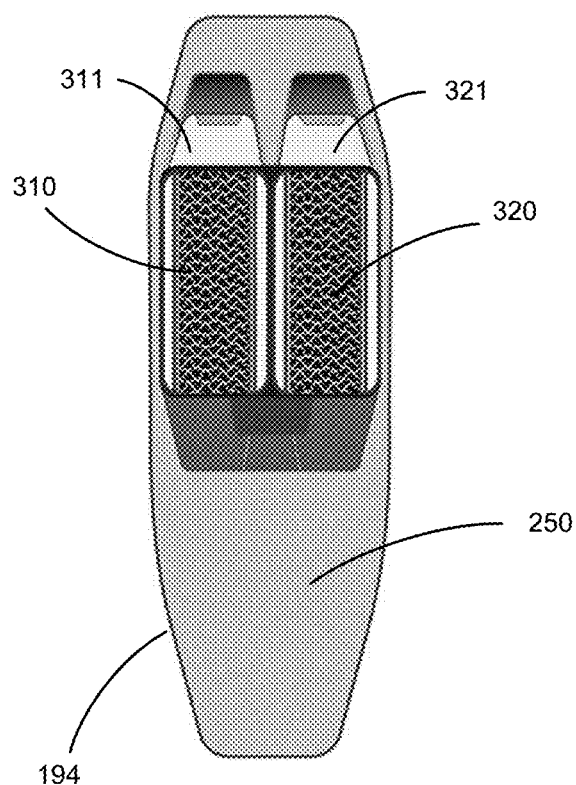
FIG. 3A is a top view of an exemplary adaptive transforming multifunction control module in a first configuration according to an embodiment of the present disclosure.
Figure 3B:
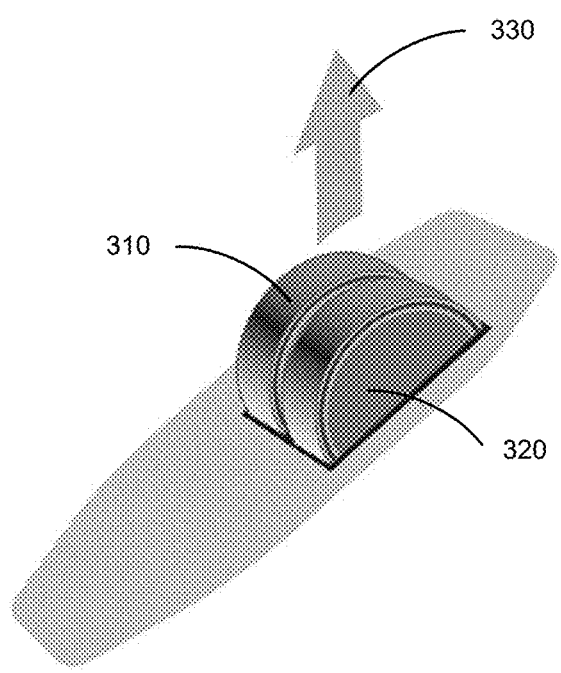
FIG. 3B is a perspective view of the exemplary adaptive transforming multifunction control module in FIG. 3A.

FIG. 3A is a top view of an exemplary adaptive transforming multifunction control module 194 in a first configuration according to an embodiment of the present disclosure. FIG. 3B is a perspective view of the exemplary adaptive transforming multifunction control module in FIG. 3A. The adaptive transforming multifunction control module 194 comprises a first control wheel 310 and a second control wheel 320. The adaptive transforming multifunction control module 194 also includes a first manual activation button 311 and a second manual activation button 321.

Each one of control wheels 310 and 320 operates in a manner analogous to the scroll wheel on a computer mouse. Each of control wheels 310 and 320 rotates about a central axis and the rotation of the control wheels 310 and 320 may be controlled by internal detents. As is well known, a detent is a device (e.g., catch, spring-operated ball, or the like) for positioning and holding one mechanical part in relation to another in a manner such that the device can be released by force applied to one of the parts. Each of control wheels 310 and 320 may be "push-to-select" controls similar to the scroll wheel on a computer mouse. The user may make a selection on a display screen by pressing downward on one of the control wheels 310 or 320. Depending on the configuration, the driver may operate both of the control wheels 310 and 310 or, alternatively, the driver may operate the control wheel 310 while the passenger independently operates the control wheel 320.

The manual activation button 311 is associated with control wheel 310. When pressed, the manual activation button 311 releases the control wheel 310, so that the electromechanical actuators (not shown) inside the center console 240 are able to elevate the control wheel 310 out of the faceplate 250, as indicated by the direction arrow 330. Similarly, the manual activation button 321 is associated with control wheel 320. When pressed, the manual activation button 321 releases the control wheel 320, so that the electromechanical actuators inside the center console 240 are able to elevate the control wheel 320 out of the faceplate 250.

Figure 4A:
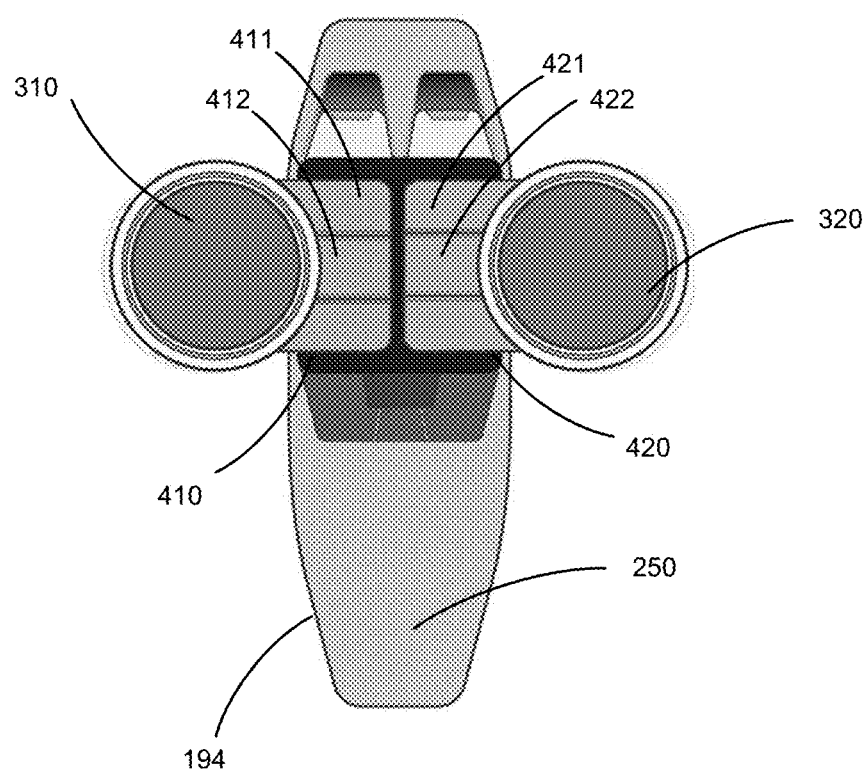
FIG. 4A is a top view of an exemplary adaptive transforming multifunction control module in a second configuration according to an embodiment of the present disclosure.
Figure 4B:
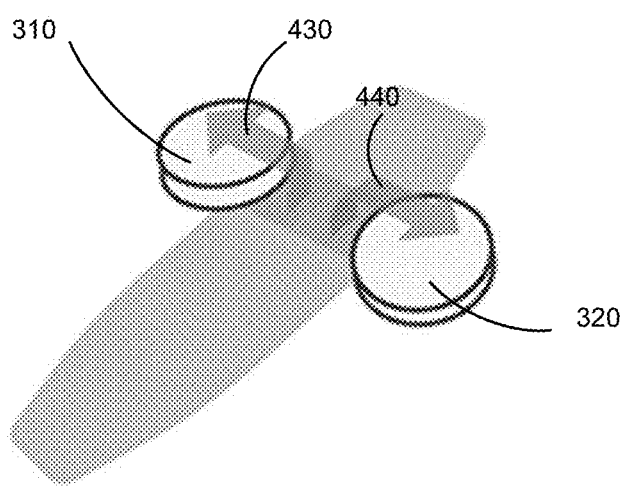
FIG. 4B is a perspective view of the exemplary adaptive transforming multifunction control module in FIG. 4A.

FIG. 4A is a top view of an exemplary adaptive transforming multifunction control module 194 in a second configuration according to an embodiment of the present disclosure. FIG. 4B is a perspective view of the exemplary adaptive transforming multifunction control module 194 in FIG. 4A.

In FIG. 4A, the control wheel 310 has been raised out of the faceplate 250 and has also been rotated or flipped to the left (as indicated by direction arrow 430) so that the control wheel 310 is horizontally oriented rather than vertically oriented. The adaptive transforming multifunction control module 194 includes an actuator arm 410 that raises and rotates the control wheel 310 to the horizontal configuration. The adaptive transforming multifunction control module 194 may further include at least one control button, such as exemplary control buttons 411 and 412. In an advantageous embodiment, the control buttons 411 and 412 may be mounted on the actuator arm 410.

Likewise, in FIG. 4A, the control wheel 320 has been raised out of the faceplate 250 and has also been rotated or flipped to the right (as indicated by direction arrow 440) so that the control wheel 320 is horizontally oriented rather than vertically oriented. The adaptive transforming multifunction control module 194 includes an actuator arm 420 that raises and rotates the control wheel 310 to the horizontal configuration. The adaptive transforming multifunction control module 194 may further include at least one additional control button, such as exemplary control buttons 421 and 422. In an advantageous embodiment, the control buttons 421 and 422 may be mounted on the actuator arm 420.

The actuator arms 410 and 420 in the console 240 may be spring-loaded devices that raise the controls wheels 310 and 320 and may rotate (or flip) the control wheels 310 and 320 to a horizontal orientation. The actuator arms 410 and 420 may also be electromechanical devices that include damping for smoother operation.

In the horizontal orientation, the control button 310 may be pressed downward in the center to make a selection. Additionally, the control buttons 411 and 412 are associated with the control wheel 310 and may be pressed by the driver to make selections. In this manner, the control buttons 411 and 412 may operate in a manner analogous to the left button and the right button on a computer mouse.

Likewise, in the horizontal orientation, the control button 320 may be pressed downward in the center to make a selection. Additionally, the control buttons 421 and 422 are associated with the control wheel 320 and may be pressed by either the driver or the front seat passenger (depending on configuration) to make selections. In this manner, the control buttons 421 and 422 may operate in a manner analogous to the left button and the right button on a computer mouse.

In FIGS. 4A and 4B, depending on the configuration, the driver may operate both of the control wheels 310 and 310 or, alternatively, the driver may operate the control wheel 310 while the passenger independently operates the control wheel 320.

Figure 5A:
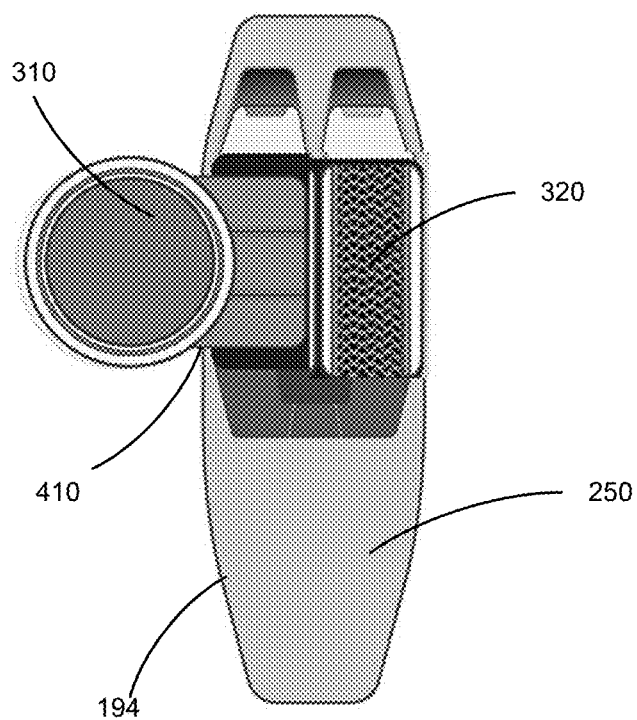
FIG. 5A is a top view of an exemplary adaptive transforming multifunction control module in a third configuration according to an embodiment of the present disclosure.
Figure 5B:
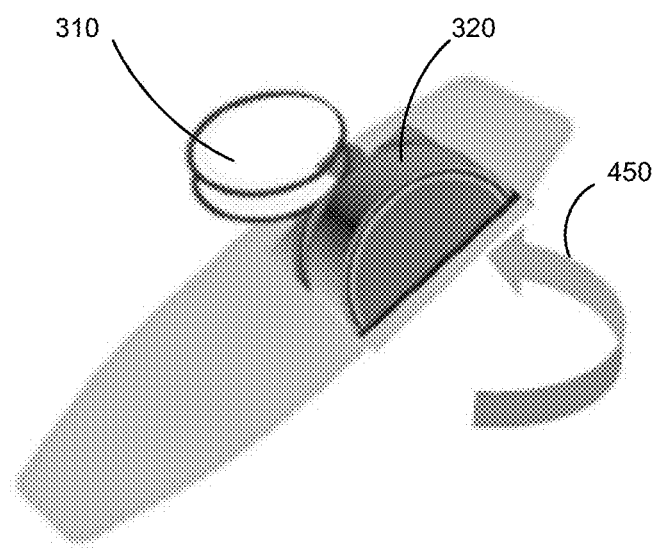
FIG. 5B is a perspective view of the exemplary adaptive transforming multifunction control module in FIG. 5A.

FIG. 5A is a top view of an exemplary adaptive transforming multifunction control module 194 in a third configuration according to an embodiment of the present disclosure. FIG. 5B is a perspective view of the exemplary adaptive transforming multifunction control module 194 in FIG. 5A. In FIG. 5A, only the control wheel 310 is raised out of the faceplate 250 and is rotated outward from the vertical centerline of the adaptive transforming multifunction control module 194. The control wheel 320 is either not deployed or has been returned to the vertical orientation, as indicated by the direction arrow 450. In FIGS. 5A and 5B, depending on the configuration, the driver may operate both of the control wheels 310 and 310 or, alternatively, the driver may operate the control wheel 310 while the passenger independently operates the control wheel 320.

Figure 6:
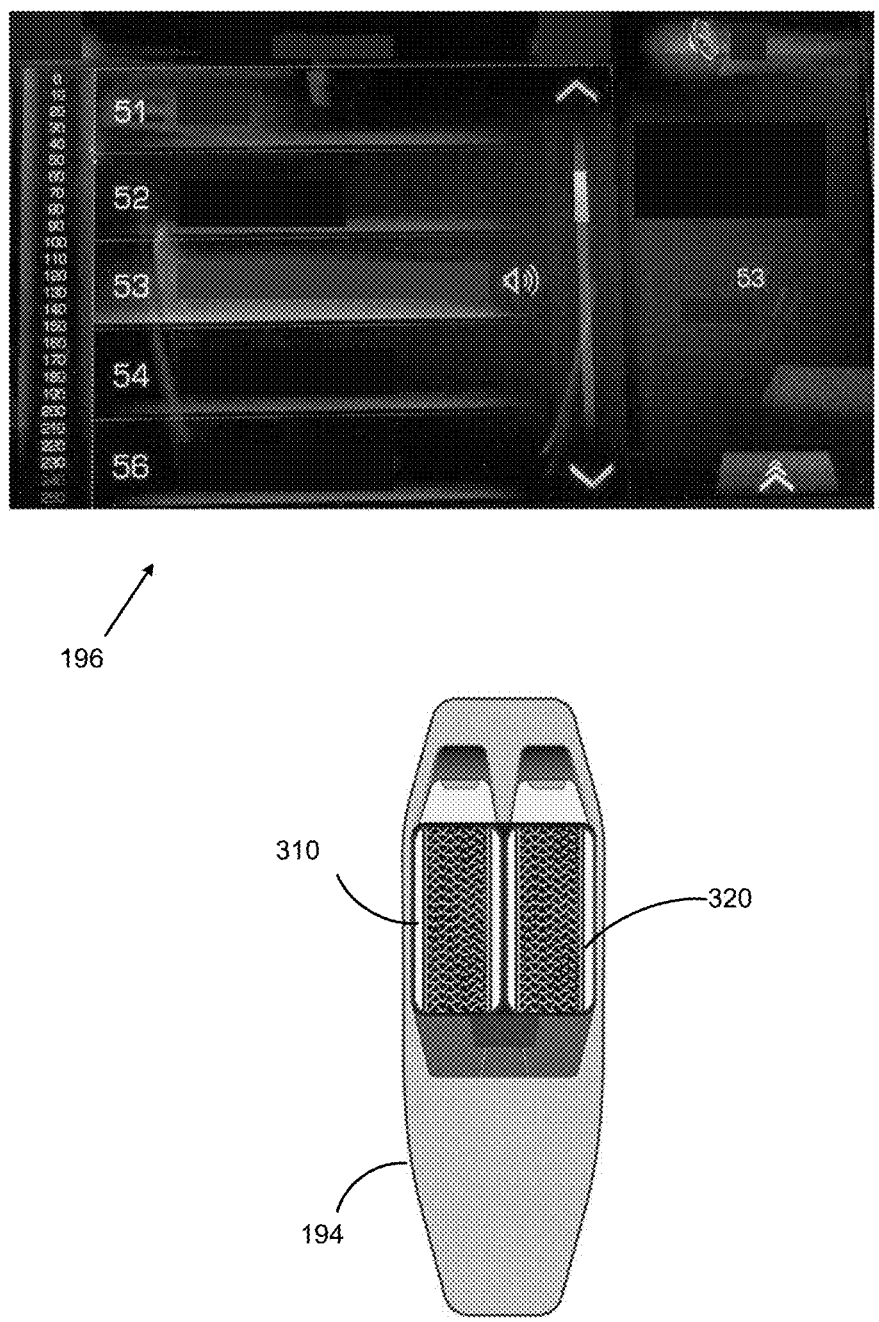
FIG. 6 illustrates the exemplary adaptive transforming multifunction control module configured to interact with a first selected system interface.

FIG. 6 illustrates the exemplary adaptive transforming multifunction control module 194 configured to interact with a first selected system interface. In the exemplary system interface, the user can select different radio stations on the satellite radio system. In the configuration, the user (e.g., the driver) may use the control wheel 320 to scroll vertically through different media types, such as satellite radio, FM radio, AM radio, Bluetooth device (e.g., mobile phone), and/or a CD player. The driver then selects satellite radio by pressing down on the control wheel 320. The driver may then use the control wheel 310 to scroll through satellite radio stations before pressing on the control wheel 310 to select a particular satellite radio station.

FIG. 7 illustrates the exemplary adaptive transforming multifunction control module 194 configured to interact with a second selected system interface. In the exemplary system interface, the user can select different infotainment systems (or functions), such as the GPS navigation system, the media type, and a garage door control function. In this configuration, the user (e.g., the driver) may use the control wheel 310 to scroll between the infotainment systems 198 or functions and select a specific system 198 and then may use the control buttons 411 and 412 and the control wheel 310 to operate the selected infotainment system 198.

Figure 8:
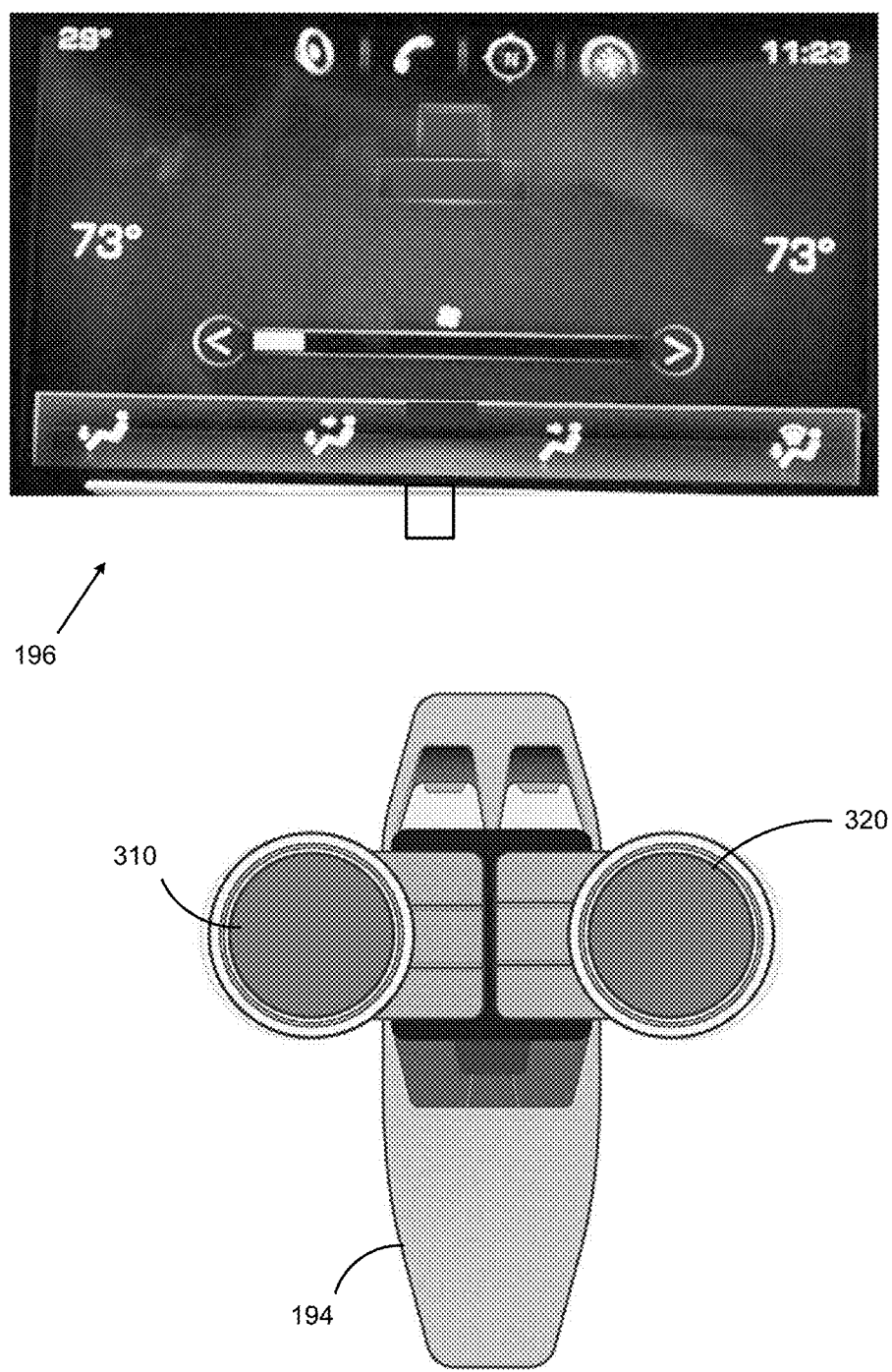
FIG. 8 illustrates the exemplary adaptive transforming multifunction control module configured to interact with a third selected system interface.

FIG. 8 illustrates the exemplary adaptive transforming multifunction control module 194 configured to interact with a third selected system interface. In the exemplary system interface, the driver and the passenger may independently operate a selected infotainment system 198, such as the HVAC system. In this configuration, the driver may use the control wheel 310 and the control buttons 411 and 412 to set the temperature and vent positions on the driver side of the passenger compartment. Simultaneously, the passenger may independently use the control wheel 320 and the control buttons 421 and 422 to set the temperature and vent positions on the passenger side of the passenger compartment.

Thereafter, the driver may use the control wheel 310 and the control buttons 411 and 412 to operate the GPS system or the cruise control system. At the same time, the passenger may independently use the control wheel 320 and the control buttons 421 and 422 to make a phone call on a mobile phone wirelessly coupled to, and controlled by, the infotainment system 198 of the vehicle system 100.

Figure 9A:
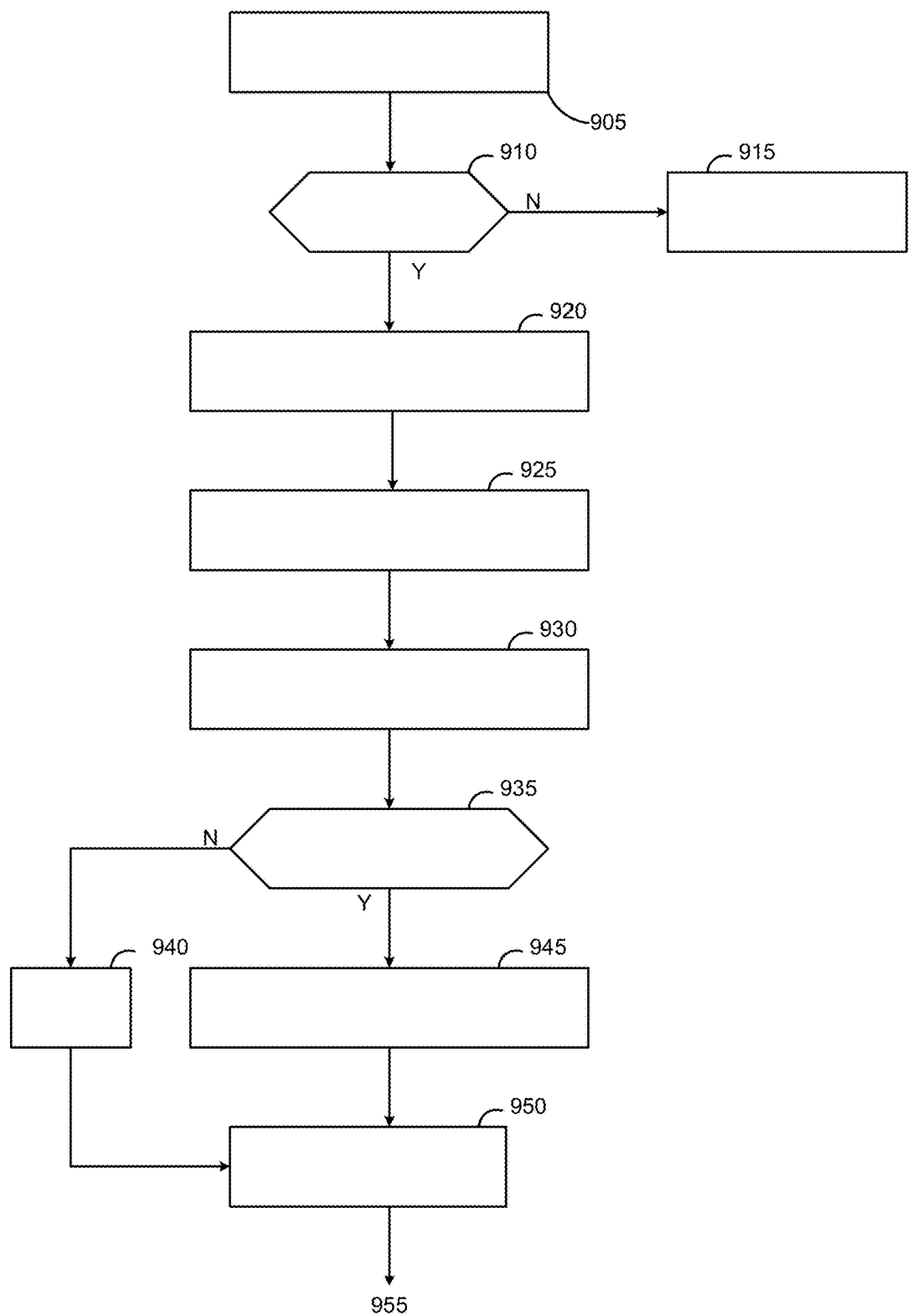
FIGS. 9A and 9B are a flow diagram illustrating operations of the exemplary adaptive transforming multifunction control module according to an embodiment of the present disclosure.
Figure 9B:
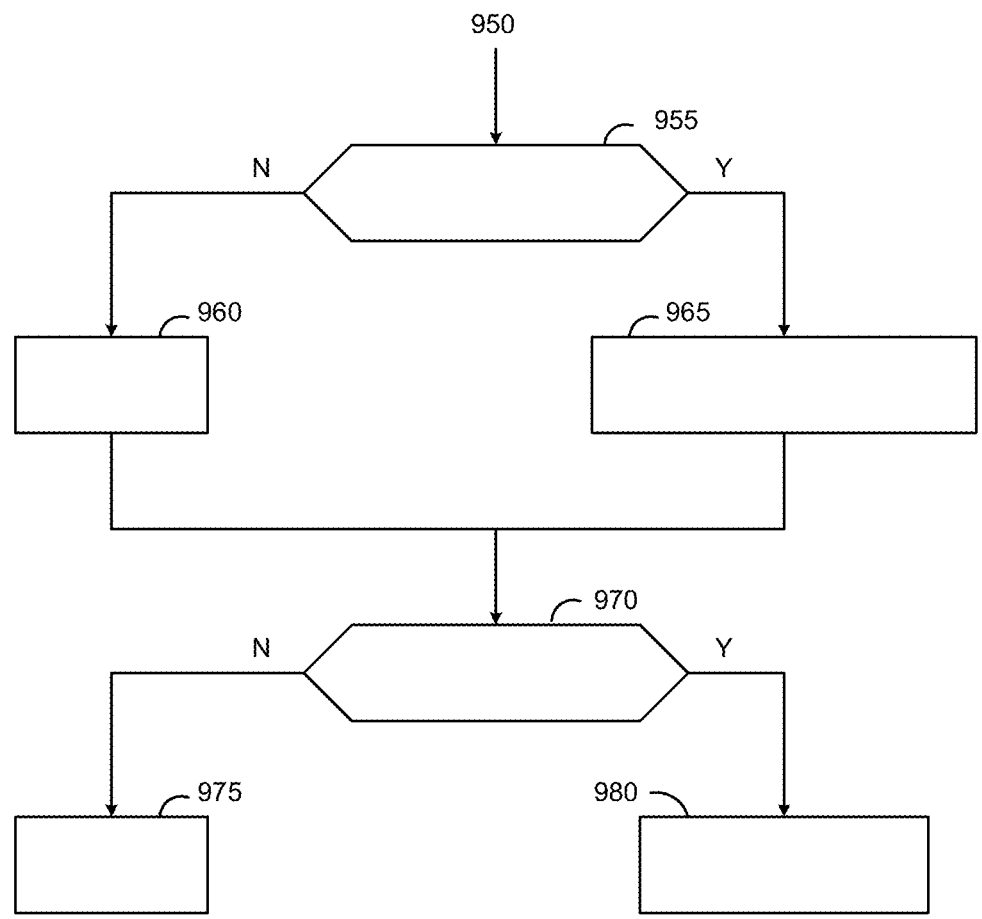

FIGS. 9A and 9B are a flow diagram illustrating operations of the exemplary adaptive transforming multifunction control module 194 according to an embodiment of the present disclosure. In a "smart system", the advanced computing module 185 may determine that there is a single user (La, driver only). In response, the advanced computing module 185 may automatically transform or reconfigure the adaptive transforming multifunction control module 194 when additional controls are beneficial for selected infotainment (e.g., navigation, satellite radio, etc.) or when control orientation is better suited for a particular interaction (e.g., scrolling, lists, volume, tuning, etc.).

The advanced computing module 185 may also determine that there is a driver and a passenger. In response, the advanced computing module 185 may transform or reconfigure the adaptive transforming multifunction control module 194 for independent control based on infotainment features selected by the individual users.

In FIGS. 9A and 9B, the adaptive transforming multifunction control module 194 may be modified by being manually transformed to suit an individual user preference or may be modified by the advanced computing module 185 based on machine learning adapted to prior user preferences. In 905, the advanced computing module 185 in the vehicle system 100 may determine the number and locations of occupants of the vehicle system 100. This may include determining the identity of the driver when the driver enters the vehicle system 100. The advanced computing module 185 may identify the driver using one or more driver-identification sensors, including but not limited to a facial recognition system or other biometric sensors, a key fob, a keypad and password, and the like.

In 910, the advanced computing module 185 determines if it may be necessary to share control wheels 310 and 320. If No in 910, the advanced computing module 185, the driver maintains control over both control wheels 310 and 320. If Yes in 910, the advanced computing module 185 determines in 920 the state of the infotainment system 198 according to the driver inputs received from the control wheels 310 and 320 and the control buttons 411, 412, 421 and 422. In 925, the advanced computing module 185 then adapts the adaptive transforming multifunction control module 194 to the number of occupants and the selected media or other infotainment functions.

At some point, in 930, one of the occupants may select a different infotainment system 198 or media. In response, the advanced computing module 185 determines in 935 if it is necessary to reconfigure the adaptive transforming multifunction control module 194. If No in 935, the advanced computing module 185 makes no changes in 940 to the adaptive transforming multifunction control module 194 and may proceed to 950. If Yes in 935, the advanced computing module 185 may reconfigure in 945 the adaptive transforming multifunction control module 194 to match the selected media or infotainment system 198.

Next, in 950, the advanced computing module 185 may determine that the number of occupants of the vehicle system 100 has changed. In response, the advanced computing module 185 again determines in 955 if it is necessary to reconfigure the adaptive transforming multifunction control module 194. If No in 955, the advanced computing module 185 makes no changes in 960 to the adaptive transforming multifunction control module 194 and may proceed to 970. If Yes in 955, the advanced computing module 185 may in 965 reconfigure the adaptive transforming multifunction control module 194 to match the selected media or infotainment system 198 based on the number of occupants.

Next, in 970, the advance computing module 185 monitors the adaptive transforming multifunction control module 194 to determine if a user wants to reconfigure the adaptive transforming multifunction control module 194. The advanced computing module 185 may determine this, for example, if a user presses either one of the manual activation buttons 311 or 312. If No in 970, the advanced computing module 185 makes no changes in 975 to the adaptive transforming multifunction control module 194. If Yes in 970, the advanced computing module 185 may reconfigure in 975 the adaptive transforming multifunction control module 194 in response to the manual inputs of the user.

The exemplary adaptive transforming multifunction control module 194 reconfigures a pair of control wheels and associated buttons to match the number of users and the type of selected infotainment system or function. However, this is by way of example only and should not be construed to limit the scope of the present disclosure. In other embodiments, adaptive transforming multifunction control module 194 may include other types of manual input devices that are reconfigured based on the number of users and the type of infotainment system. Other such devices may include, for example, a joystick, a directional pad (d-pad), a capacitive touchpad surface (track-pad), a slider, a rocker, a trackball, a gesture control, or a similar device that translates its orientation or duplicates itself for two passengers. The transforming control is not limited to changing orientation only. For example, the adaptive transforming multifunction control module 194 may change control type as well. For example, the adaptive transforming multifunction control module 194 may initially be a control knob in a first configuration. In a second configuration, the control knob may pop-out of the adaptive transforming multifunction control module 194 to become a joystick that better corresponds to the infotainment feature selected.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system comprising:
   an infotainment system including a dashboard display; and
   an adaptive transforming multifunction controller configured to:
      receive manual inputs from a first occupant of the vehicle system; and
      perform at least one operation based on a first selected function associated with the infotainment system,
   wherein the adaptive transforming multifunction controller includes:
      a first control wheel;
      a first actuator arm that moves the first control wheel between a vertical orientation and a horizontal orientation;
      a second control wheel; and
      a second actuator arm that moves the second control wheel between a vertical orientation and a horizontal orientation.

2. The vehicle system as set forth in claim 1, wherein the first control wheel is configured to operate as a scroll wheel in the vertical orientation based on the first selected function of the infotainment system to display a scrollable list on the dashboard display.

3. The vehicle system as set forth in claim 1, wherein the first actuator arm comprises at least one control button configured to control the first selected function of the infotainment system.

4. The vehicle system as set forth in claim 3, wherein at least one operation associated with the second control wheel is configured based on one of:
   the first selected function; or
   a second selected function associated with the infotainment system.

5. The vehicle system as set forth in claim 4, wherein the second control wheel is movable between the vertical orientation and the horizontal orientation in response to a manual input from the first occupant or a second occupant.

6. The vehicle system as set forth in claim 5, wherein the second control wheel is configured to operate as a scroll wheel in the vertical orientation based on the first selected function or the second selected function to display a scrollable list on the dashboard display.

7. The vehicle system as set forth in claim 4, wherein the second actuator arm comprises at least one control button configured to control the first or second selected function of the infotainment system.

8. The vehicle system as set forth in claim 1, wherein the adaptive transforming multifunction controller is disposed in a center console located between a driver seat and a front passenger seat of the vehicle system.

9. The vehicle system as set forth in claim 8, wherein the adaptive transforming multifunction controller is mounted in a faceplate associated with the center console.

10. The vehicle system as set forth in claim 9, wherein the first and second control wheels are recessed in the faceplate in the vertical orientation.

11. The vehicle system as set forth in claim 10, wherein the first and second control wheels are raised out of the faceplate and rotated horizontally by the first and second actuator arms, respectively, when the first and second control wheels are moved between the vertical orientation and the horizontal orientation.

12. The vehicle system as set forth in claim 1, wherein the first and second control wheels may be configured independently.

13. The vehicle system as set forth in claim 1, wherein the first actuator arm moves the first control wheel in a direction towards a driver seat and the second actuator arm moves the first control wheel in a direction towards a passenger seat.

* * * * *